United States Patent Office 3,332,019
Patented July 18, 1967

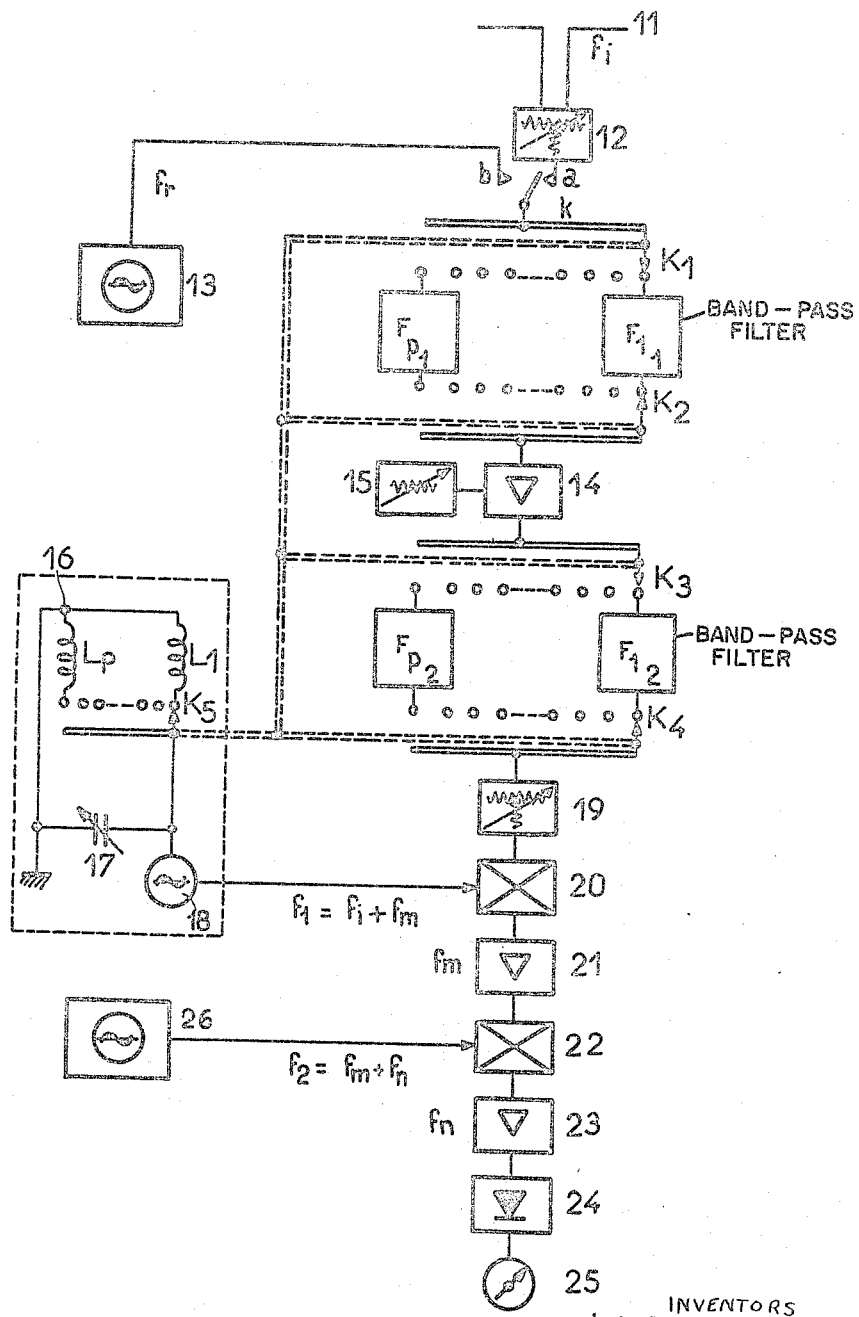

3,332,019
SYSTEM FOR MEASURING ELECTRO-MAGNETIC FIELD INTENSITY
Joseph Leostic, Sevres, Lucien Babany, Blanc-Mesnil, Alain Cabet, Paris, and Jacques Selz, Viroflay, France, assignors to C.I.T. Compagnie Industrielle des Telecommunications, Paris, France
Filed Feb. 10, 1964, Ser. No. 343,563
Claims priority, application France, Feb. 13, 1963, 924,649
3 Claims. (Cl. 325—363)

Devices for measuring electric radiation fields are in fact selective high-frequency microvoltmeters. They generally consist of a selective heterodyne receiver which feeds a galvanometer through a detector.

Excellent direct-reading selective high-frequency microvoltmeters are known which operate in wide ranges and give very good results in the laboratory measurement technique. These devices comprise at their input a low-pass filter which transmits to a first frequency changer the whole of the band of frequencies received, without any selectivity within the band. However, while these devices are completely satisfactory for laboratory measurements, more especially in the Faraday cage, they cannot be used for field measurements, because some selectivity within the operating band is then necessary for reducing the level of the incident parasitic fields to a value which does not exceed the range of linear operation of the high-frequency amplifier and of the first frequency changer.

In addition, conventional receivers employed for carrying out field measurements must comprise, in order to have sufficient sensitivity, a selective high-frequency amplification.

However, if this amplifier stage is constructed in conventional manner, i.e. from tuned circuits of the LC type, its gain varies, as is known, in accordance with the frequency which it receives. Field measuring devices which comprise an amplifier of this type must therefore be provided with an auxiliary generator, graded in voltage, by means of which the receiver must be calibrated for each measuring frequency, which complicates the measurements and increases the weight, the overall dimensions and the cost of the device. It is true that such an auxiliary generator could be dispensed with, but this would be to the detriment of the precision of the measurements, and this would entail reading a calibration curve for each measurement.

The present invention relates to a field measuring device which is not subject to these disadvantages.

It comprises in known manner a receiver having two frequency change stages, of which the first stage is fed by a multiple-range local oscillator, this receiver feeding a galvanometer through a rectifier, and it is characterized by the fact that it comprises, on the one hand, a single high-frequency amplifying member for all the ranges, which may be associated through a range switch of the local oscillator, with at least one band-pass filter peculiar to each range, so as to constitute for each range an amplifier having a fixed construction and constant gain, the amplifiers for all the ranges having the same gain, and on the other hand at least one graded adjustable attenuation network so connected as to enable the needle of the galvanometer to be returned to a fixed reference point after the tuning of the receiver to the frequency to be received, the value of the field received being deduced from the attenuation read on the said network.

The field measuring device according to the invention comprises in addition, on the one hand, a gain monitoring and adjusting member associated with a single amplifying member, and on the other hand an auxiliary generator supplying to the said amplifying member a fixed frequency $f_r$, of constant level, which is situated in any one of the ranges to be received, so that it is possible, when the switch for the selection of the band filters has been set to the position corresponding to the said range, to proceed with the checking and, where necessary, re-adjustment of the gain of the amplifying member.

The field measuring device according to the invention thus permits of effecting a single grading on a single frequency at the time when it is put into operation, and makes it possible thus to avoid the use of the graded generator which is associated with field measuring devices of known type. On the other hand, it gives a direct reading on a graded member of the level of the field measured in relation to a reference level.

There will be described in detail by way of example a possible constructional form of the field measuring device according to the invention, with reference to the accompanying figure.

In this figure, 11 denotes a dipole which receives the field to be measured, of frequency $f_1$, 12 denotes a network having adjustable attenuation and constant impedance, $F1_1 \ldots F_{p1}$ denote $p$ input band-pass filters, for example of the "flat" type, having constant impedance and constant transition loss in the range to which each of them is allocated, 14 denotes an amplifying member proper, for example a transistor, with which is associated a gain adjusting member 15, $F1_2$ to $F_{p2}$ denote other band-pass filters also having constant impedance and transition loss in the range to which they are allocated, 19 denotes a second adjustable attenuation network, 20 denotes a first frequency changer, 21 denotes a selective amplifier tuned to the output frequency $f_m$ of 20, 22 denotes a second frequency changer, 23 denotes a selective amplifier tuned to the fixed frequency $f_n$ at the output of 22, 24 denotes a detecting member and 25 denotes a galvanometer.

An adjustable local oscillator 16 comprises a generator 18 and coils $L_1$ to $L_p$ corresponding to the different ranges, as also a variable condenser 17. This oscillator supplies to the first frequency changer 20 a local frequency $f_1$ such that $f_1 = f_1 + f_m$. 26 denotes an oscillator supplying to the second frequency changer 22 a fixed frequency $f_2$ necessary for the shift from the first intermediate frequency $f_m$ to the second intermediate frequency $f_n = f_2 - f_m$.

13 denotes an auxiliary calibrating generator supplying a fixed frequency comprised in the band to be received, and of which the output level is maintained constant within narrow limits, for example 0.02 db, by known means such as, for example, the locking of the rectified output voltage to a very stable unidirectional voltage by means of a direct-current amplifier.

K denotes a key which, in the position $a$, permits of connecting the dipole 11 to the receiver and, in the position $b$, of checking the gain of the receiver and, where necessary, readjusting it by means of the member 15, which may be, for example, a resistance, by adjustment of which the operating point of the amplifying member 14 can be shifted.

$K_1$ to $K_5$ denote pancake windings of a range-selecting switch.

The choice of the width of the ranges must conform to a number of conditions:

(1) The ranges must be fairly narrow in order to ensure sufficient selectivity before the first frequency change.

(2) They must be sufficiently narrow to permit the provision of band-pass filters supplying a constant gain, to within ±1 db, for example, in the useful part of the pass band between the input of the first filter ($F1_1 \ldots$) and the output of the second filter ($F1_2 \ldots$).

(3) They must be so wide that their number is not excessive, about fifteen appearing to be the admissible maximum.

(4) Preferably, the extreme frequencies of the ranges must have round megacycle/second values in order to facilitate exploitation.

If, in order to give a clear idea, the case of a field measuring instrument covering the 5–24 mc./s. band is considered, account will be taken of the fact, in determining the necessary selectivity, that a decametric wave receiver having high sensitivity and giving satisfactory results has at the top of the range, towards 24 mc./s., high-frequency tuning circuits whose band width is of the order of 1 mc./s., with an attenuation of 3 db. In principle, therefore, a band width of 1 mc./s. is admissible.

This band width of 1 mc./s. is retained for the portion of the band between 5 and 10 mc./s. It is known how to construct band-pass filters (for example filters of the flat type) which satisfy condition No. 2 in these circumstances.

On this basis, it has been possible, with satisfactory results, to bring the band width to 2 mc./s. beyond 10 mc./s. (condition No. 3), taking limited ranges for round megacycle/second values (condition No. 4).

A receiver is thus obtained which comprises twelve ranges: 5–6 mc./s., 7–8, 8–9, 9–10, 10–12 . . . and then in twos up to 24 mc./s.

If the receiver can receive voltages between, for example, 1 and 100,000 microvolts, it will be so calibrated that the needle of the galvanometer 25 comes opposite a reference mark for a field of 1 microvolt per metre at a predetermined frequency, the two attenuation networks being adjusted to their minimum attenuation. In order to measure higher fields, the two attenuation networks will be so adjusted as to bring the needle of the galvanometer into the immediate neighbourhood of the same reference mark, and the corresponding attenuation will be read on the graduation of the said networks.

The maximum attenuation produced by the set of two networks may be of the order of 100 decibels. The network 12 may then have, for example, three positions of adjustment corresponding to 0, 20 and 40 db respectively, and the network 19 may comprise a number of taps by means of which it is possible to obtain all the attenuation values in steps of 1 decibel between 0 and 60 db. In this way, the voltage at the input of the input transistor (14) will never exceed 1 mv. If, for example, this transistor can receive an input voltage of 20 to 50 mv. without leaving its range of linear operation, the correct operation of the field measuring device will therefore be ensured even if it receives parasitic signals which have, in its reception band, a strength considerably greater than that of the useful signal.

In order to obtain, from the value in microvolts of the voltage at the input of the receiver, the value in microvolts per metre of the field received by the dipole, it is of course necessary to perform a calculation or to refer to a curve, but the receiver does not in itself necessitate any correction after it has been appropriately adjusted by means of the incorporated generator.

Of course, the above-described microvoltmeter, which permits direct reading, in decibels, of the level of the voltage applied to its input, could also be associated with a low-frequency amplifier in order to form a general-purpose receiver.

We claim:
1. In a device for measuring the intensity of a radio-wave received on aerial, one aerial, a first set of band-pass filters, each tuned to a different frequency range, a first element of a multiple-element switch making it possible to connect the aerial to the input of any one of the said filters relating to the first set, a second element of the said switch making it possible to connect the output of the said filter to the input of an amplifier incorporating means of gain control, a second set of band-pass filters tuned respectively to the same frequency bands as the filters of the first band-pass filter set, a third element of the said switch making it possible to connect the output of the said amplifier to the input of any one of the band-pass filters relating to the said second band-pass filter set, a fourth element of the said switch making it possible to connect the output of the said band-pass filter relating to the second band-pass filter set to the input of a calibrated adjustable attenuation network whose output is connected to the input of a receiving set comprising at least one frequency-changer stage, the said frequency changer stage being fed by a local oscillator supplying a carrier current whose frequency is adjustable in ranges by means of a fifth element of said switch, and a detector and a galvanometer connected to the output of the receiving set.

2. Device according to claim 1 in which the band-pass filters of both band-pass filter sets are determined so that the gain of the assembly formed by the amplifier and both input and output band-pass filters with which it is associated is constant, whatever the said filters may be.

3. In a device according to claim 1, and adjustable-attenuation network whose input is connected to the aerial, and whose output can be connected, by means of an auxiliary switch, either to an auxiliary fixed-frequency generator, or to the first element of the multiple-element switch.

No references cited.

KATHLEEN H. CLAFFY, *Primary Examiner.*

R. S. BELL, *Assistant Examiner.*